United States Patent
Uehara et al.

(10) Patent No.: US 8,072,336 B2
(45) Date of Patent: Dec. 6, 2011

(54) RUBBER-COVERED RFID MODULE, AND PNEUMATIC TIRE HAVING THE IT IS EMBEDDED

(75) Inventors: Tsuyoshi Uehara, Kanagawa (JP); Takue Tsuji, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 704 days.

(21) Appl. No.: 12/279,268

(22) PCT Filed: Feb. 26, 2007

(86) PCT No.: PCT/JP2007/054107
§ 371 (c)(1), (2), (4) Date: Aug. 13, 2008

(87) PCT Pub. No.: WO2007/100111
PCT Pub. Date: Sep. 7, 2007

(65) Prior Publication Data
US 2009/0015415 A1 Jan. 15, 2009

(30) Foreign Application Priority Data
Feb. 27, 2006 (JP) .................. 2006-050725

(51) Int. Cl.
*G08B 13/14* (2006.01)
*B60C 23/00* (2006.01)
*H01L 23/22* (2006.01)

(52) U.S. Cl. .................. 340/572.8; 340/572.1; 340/442; 340/447; 340/10.1; 257/687; 257/787; 257/788

(58) Field of Classification Search ............... None
See application file for complete search history.

(56) References Cited

U.S. PATENT DOCUMENTS

| 5,483,827 | A | * | 1/1996 | Kulka et al. .................. 73/146.5 |
| 6,885,291 | B1 | * | 4/2005 | Pollack et al. ................. 340/445 |
| 7,292,138 | B2 | * | 11/2007 | Jang .............................. 340/442 |
| 2004/0159383 | A1 | | 8/2004 | Adamson et al. |
| 2004/0252072 | A1 | | 12/2004 | Adamson et al. |
| 2005/0099283 | A1 | * | 5/2005 | Johnson et al. ............... 340/447 |
| 2006/0071767 | A1 | * | 4/2006 | Johanning et al. ............ 340/447 |
| 2006/0220816 | A1 | * | 10/2006 | Scheungraber et al. ...... 340/447 |

(Continued)

FOREIGN PATENT DOCUMENTS
CN 1674352 A 9/2005
(Continued)

OTHER PUBLICATIONS

English language Supplemental European Search Report dated Apr. 29, 2010 in counterpart European Application No. 07737719.0.

*Primary Examiner* — Julie Lieu
(74) *Attorney, Agent, or Firm* — Connolly Bove Lodge & Hutz LLP

(57) ABSTRACT

An RFID module comprising a transponder covered with a 0.2 to 2 mm thick rubber sheet containing 100 parts by weight of a diene-based rubber, less than 30 parts by weight of carbon black and 5 to 55 parts by weight of silica, having a relative permittivity of 7 or less and having a dynamic modulus of elasticity (E') of 2 to 12 MPa, which can extend a communication distance with a required installation location and is superior in the durability at the time of being embedded in the tire.

8 Claims, 1 Drawing Sheet

U.S. PATENT DOCUMENTS

2008/0042851 A1 * 2/2008 Baba et al. ................. 340/572.8

FOREIGN PATENT DOCUMENTS

| | | |
|---|---|---|
| EP | 1580041 A1 | 9/2005 |
| JP | 05-169931 | 7/1993 |
| JP | 2000108621 | 4/2000 |
| JP | 2001525282 | 12/2001 |
| JP | 2002271127 | 9/2002 |
| JP | 2005096423 | 4/2005 |
| JP | 2005096726 | 4/2005 |
| JP | 2005170065 | 6/2005 |
| JP | 2005170222 | 6/2005 |
| JP | 2005323339 | 11/2005 |
| WO | WO-99/29523 A1 | 6/1999 |

* cited by examiner

US 8,072,336 B2

RUBBER-COVERED RFID MODULE, AND PNEUMATIC TIRE HAVING THE IT IS EMBEDDED

This application is a national phase of PCT/JP2007/054107, filed on Feb. 26, 2007, which claims priority to JP 2006-050725, filed on Feb. 27, 2006, the entire contents of all are hereby incorporated by reference.

TECHNICAL FIELD

The present invention relates to a rubber covered RFID (i.e., Radio Frequency Identification) module, more specifically relates to a rubber-covered RFID module capable of extending the communication distance with the required installation location and superior in the tire durability when embedded in a tire.

BACKGROUND ART

In recent years, to prevent auto theft, production control of tires, shipment control of tires history of use of tires after being handed over to the users, etc., technology has been developed mounting transponders with built-in memories (i.e., RFID tags) in vehicles and tires. In many prior art, the transponders are placed at the insides and outsides of vehicles or the inside surfaces of tires, but in such cases, there are the problems that the transponders are affected by the absorption of the electromagnetic waves, interference, etc. by members at the location of installation or its vicinity, the communication distance between the transponder and the transmitter becomes shorter, or communication becomes impossible due to noise. Further, in particular, when placed inside a tire etc., since the tire deforms by a large extent during operation, there is the problem that the transponder easily breaks.

In the past, as utilizations of such transponders, prior arts placing transponders inside the tires to record various types of tires and vehicle information and calling them up for use in tires and vehicle management etc. or further coupling sequential tires and vehicle information from the same with drive control devices to control operations etc. are disclosed in, for example, Japanese Patent Publication (A) No. 2005-170065. Further, technology for capturing the wet, dry or other road surface conditions as changes in the permittivity between tire grooves and measuring the electrostatic capacity of the transponder provided at the tire tread to judge the road surface conditions and control the operation of the vehicle is disclosed in, for example, Japanese Patent Publication (A) No. 2005-170222.

Furthermore, as technology for preventing breakage of transponders and preventing poor communication due to electromagnetic wave interference, embedding a rod shaped transponder in the tire beads is disclosed in, for example, Japanese Patent Publication (A) No. 2000-108621, while placing a transponder on a plate shaped magnetic member arranged around the tire valve structure is disclosed in, for example, Japanese Patent Publication (A) No. 2005-96726. Further, to prevent the transponder from being affected by noise, placement via an electromagnetic wave shield with an electric resistivity of $1 \times 10^6$ Ω·cm or more between the transponder and the part attached to is disclosed in, for example, Japanese Patent Publication (A) No. 2002-271127.

DISCLOSURE OF THE INVENTION

The object of the present invention is to provide a rubber-covered RFID module designed to prevent shortening of the communication distance accompanied by the effects of absorption of electromagnetic waves by surrounding members (e.g., metal, rubber, etc.) and electromagnetic wave interference and further to prevent reduction of the durability of the tire in particular when using an RFID module embedded in a tire, etc.

In accordance with the present invention, there is provided an RFID module comprising a transponder covered with a 0.2 to 2 mm thick rubber sheet containing 100 parts by weight of a diene-based rubber, less than 30 parts by weight of a carbon black and 5 to 55 parts by weight of silica, having a relative permittivity of 7 or less and having a dynamic modulus of elasticity (E') of 2 to 12 MPa and also to provide a pneumatic tire in which it is embedded inside the tire at a position above a rim-flange contact portion from a tire shoulder portion.

BEST MODE FOR CARRYING OUT THE INVENTION

Figure 2:
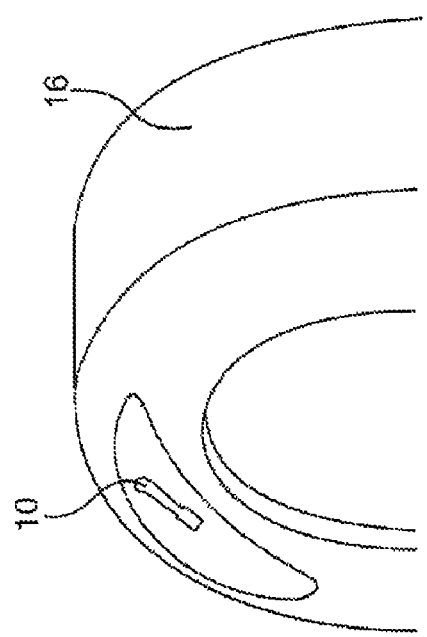
FIG. 2 is a partial isometric view of a pneumatic tire 16 with a RFID module 10 according to the present invention embedded inside at a position the tire at a position above a rim flange contact portion from a tire shoulder portion.
Figure 1:
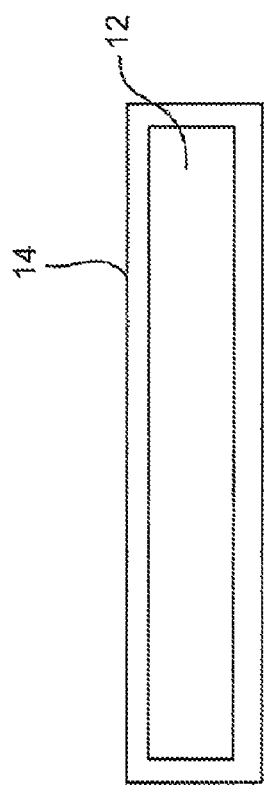
FIG. 1 is a schematic view of a RFID module 10 comprising a transponder 12 covered with a rubber sheet 14 according to the present invention.

In the present invention, when setting an RFID module in the vehicle or tire, there are the problems that the RFID is affected by the properties of the metal or rubber of the installation location (e.g., permittivity, magnetic permeability, resistivity, etc.), the communication distance is shortened, noise is generated, etc. Further, the problems arise of the deterioration of performance of the RFID per se due to the vibration, impact, etc. accompanying long term use and deterioration of the durability of the tire per se due to the embedded transponder. The inventors studied for solving these problems and discovered that it is effective to cover the RFID module with rubber sheets having a predetermined thickness into which predetermined amounts of carbon black and silica were compounded and having a predetermined relative permittivity and dynamic modulus of elasticity.

The rubber-covered RFID module of the present invention envisions being utilized in particular embedded between the bead portion and the side portion of a tire. In general, the bead portion of the tire has a dynamic modulus of elasticity of 4 to 5 MPa, while the side portion has a dynamic modulus of elasticity of about 5 to 7 MPa. Therefore, to prevent the tire from breaking during the use at the tire side with its large flexing due to the embedded RFID module, the covering rubber composition has to have a dynamic modulus of elasticity of about 2 to 12 MPa, preferably 4 to 7 MPa or so. On the other hand, to prevent the occurrence of noise, the shortening of the communication distance and the other electromagnetic wave interference from occurring in RFID modules embedded in a tire part, in general it is sufficient to make the relative permittivity of the covering rubber composition approach the relative permittivity of 1 in vacuum. The permittivity of the covering rubber composition is preferably small.

The transponder of the rubber-covered RFID module of the present invention (RFID tag) is not particularly limited, but for example a μ (mu) chip made by Hitachi Ltd, a UHF band RFID tag made by Intermec Technologies, etc. may be used.

For the base rubber of the covering rubber in the rubber-covered RFID module of the present invention, any diene-based rubber ordinarily used for a tire, for example, natural rubber (NR), polyisoprene rubber (IR), polybutadiene rubber (BR), styrene-butadiene copolymer rubber (SBR), acrylonitrile-butadiene copolymer rubber (NBR), chloroprene rubber, ethylene-propylene-diene copolymer rubber (EPDM), styrene-isoprene copolymer rubber, styrene-isoprene-butadiene copolymer rubber, isoprene-butadiene copolymer rubber, butyl rubber or other diene-based rubber is used. As the base rubber, the rubbers may be used alone or in any blend of two or more thereof.

As the carbon black compounded into the covering rubber in the rubber-covered RFID module of the present invention, for example, ISAF, HAF, FEF, GPF, SRF or other carbon blacks may be used. Further, as the silica compounded into the covering rubber in the rubber-covered RFID module of the present invention, dry silica, wet silica, sol-gel method silica, colloidal silica or any other silica obtained by a known method, may be used.

For the covering rubber of the rubber-covered RFID module of the present invention, it is possible to use a covering rubber composition, into which carbon black is compounded in an amount of less than 30 parts by weight, preferably 0 to 10 parts by weight, more preferably 0 to 5 parts by weight and silica in an amount of 5 to 55 parts by weight, preferably 15 to 45 parts by weight, based upon 100 parts by weight of the diene-based rubber. By compounding the specific amounts of carbon black and silica, the covering rubber of the RFID module having a relative permittivity of 7 or less, preferably 3 to 7 and having a dynamic modulus of elasticity (E') at 20° C. or less of 2 to 12 MPa, more preferably 4 to 7 MPa can be obtained. Further, the thickness in the covering rubber of the RFID module is preferably 0.2 to 2 mm. If the thickness is small, the expected function and effects cannot be exhibited, while conversely if too great, no further improvement in the function and effects can be seen and conversely problems are liable to arise in terms of the tire durability.

In the rubber-covered RFID module of the present invention having an RFID module covered with the covering rubber composition including specific amounts of carbon black and silica, the electromagnetic wave interference at the time of communication is greatly improved due to the low relative permittivity and the communication distance can be greatly extended. Further, when the covered RFID module is embedded in a predetermined location of the pneumatic tire, the durability of the tire is greatly improved due to the optimum dynamic modulus of elasticity.

When an RFID module having a transponder covered with the above specific covering rubber composition of the present invention is embedded inside the tire at a position above the rim-flange contact part from the shoulder of the pneumatic tire, since this location is the smallest in flexing during use and is a position perfect in terms of communication conditions, it is possible to effectively utilize the rubber-covered RFID module.

The rubber composition for covering RFID of the present invention may further contain an ordinary vulcanization or cross-linking agent, vulcanization or cross-linking accelerator, antioxidant, filler, plasticizer and other various types of compounding agents compounded for general use and tire rubber. These compounding agents may be mixed by a general method to obtain a rubber composition which is then vulcanized or cross-linked. The amounts of these compounding agents may be made the conventional general amounts so long as the object of the present invention is not adversely affected.

EXAMPLES

The present invention will now further explained by a Prior Example, Examples and Comparative Examples, but the technical scope of the present invention is by no means limited to these Examples.

Fabrication of Test Sample

Following the formulation shown in Table 1 (parts by weight), the rubber, carbon black, silica and other ingredients other than the sulfur and vulcanization accelerator were charged into a 1.7 liter internal type Banbury mixer and mixed for 5 minutes. The rubber was discharged from the mixer and cooled to room temperature to obtain a master batch. This was charged into the same Banbury mixer again, then mixed with the sulfur and vulcanization accelerator to obtain a rubber composition. The rubber composition thus obtained was press vulcanized in a 15 cm×15 cm×0.2 cm mold at 160° C. for 40 minutes to fabricate the required test sample (i.e., rubber sheet) which was then used for the following tests of the relative permittivity (950 MHz permittivity) and dynamic modulus of elasticity.

Test Method

1) Relative permittivity (950 MHz permittivity): A rubber sheet was punched to form a donut-shape of an inside diameter of 3 mm and an outside diameter of 7 mm and a relative permittivity was determined using a network analyzer (Vector Network Analyzer 37369C made by Anritsu) by the waveguide method.

2) Dynamic modulus of elasticity (E'): A viscoelastic spectrometer made by Toyo Seiki Seisakusho was used to determine the dynamic modulus of elasticity under conditions of 20° C., initial strain: 10%, amplitude: ±2% and frequency: 20 Hz.

Fabrication of Test Tire

RFIDs were covered by being sandwiched between two rubber sheets having a thicknesses of 1, 2 and 3 mm fabricated from the rubber compositions of the present invention, were arranged at the front ends of bead fillers of 11R225 size heavy duty tires. Tires were formed and vulcanized by ordinary methods to obtain test tires.

Test Method

3) Communication distance: An RFID scanner AWID MRR 1510 was slowly brought closer to a fixed test tire from a sufficiently separate distance. The distance determined by the signal of the RFID first read by the scanner was recorded. Each tire was tested five times. The average value was made the communication distance.

4) Durability test/breakage: A test tire was inflated to 850 kPa with air, then subjected to an indoor drum test at a load of 53.46 kN, speed of 30 km/h and no steering angle and visually checked for any breakage near the RFID module due to running.

Prior Example

Examples 1 to 5 and Comparative Examples 1 to 3

The results of the tests are shown in the following Table I.

TABLE I

|  | Conv. ex. | Ex. 1 | Ex. 2 | Ex. 3 | Comp. Ex. 1 | Comp. Ex. 2 | Ex. 4 | Comp. Ex. 3 | Ex. 5 |
|---|---|---|---|---|---|---|---|---|---|
| Formulation (parts by weight) | | | | | | | | | |
| Natural rubber[*1] | 100 | 100 | 100 | 100 | 100 | 100 | 100 | 100 | 100 |
| Carbon black[*2] | 45 | — | — | — | 50 | 35 | — | — | 25 |
| Silica[*3] | — | 30 | 40 | 50 | 10 | 45 | 40 | 40 | 5 |
| Zinc oxide[*4] | 4 | 4 | 4 | 4 | 4 | 4 | 4 | 4 | 4 |

TABLE I-continued

|  | Conv. ex. | Ex. 1 | Ex. 2 | Ex. 3 | Comp. Ex. 1 | Comp. Ex. 2 | Ex. 4 | Comp. Ex. 3 | Ex. 5 |
| --- | --- | --- | --- | --- | --- | --- | --- | --- | --- |
| Stearic acid*5 | 2 | 2 | 2 | 2 | 2 | 2 | 2 | 2 | 2 |
| Antioxidant*6 | 1 | 1 | 1 | 1 | 1 | 1 | 1 | 1 | 1 |
| Antioxidant*7 | 1 | 1 | 1 | 1 | 1 | 1 | 1 | 1 | 1 |
| Aromatic oil*8 | 3 | 3 | 3 | 3 | 3 | 3 | 3 | 3 | 3 |
| Sulfur*9 | 2 | 3 | 3 | 3 | 3 | 3 | 3 | 3 | 3 |
| Vulcanization accelerator*10 | 1 | 1 | 1 | 1 | 1 | 1 | 1 | 1 | 1 |
| Covering rubber thickness (mm) | 1 | 1 | 1 | 1 | 1 | 1 | 2 | 3 | 1 |
| Physical properties and performance |  |  |  |  |  |  |  |  |  |
| Relative permittivity (950 MHz permittivity) | 11.1 | 3.3 | 3.6 | 3.9 | 11.3 | 8.0 | 3.6 | 3.6 | 6.4 |
| Dynamic modulus of elasticity (E') (MPa) | 4.5 | 2.88 | 4.68 | 7.01 | 9.65 | 13.42 | 4.72 | 4.68 | 3.01 |
| Communication distance (cm) | 14.1 | 25.4 | 24.3 | 24.6 | 10.1 | 18.3 | 22.4 | 22.7 | 19.5 |
| Durability test/breakage | None | None | None | None | None | Yes | None | Yes | None |

(Note)
*1Natural rubber STR-20
*2Shoblack N330 (made by Showa Cabot)
*3Nipsil AQ (made by Japan Silica)
*4Zinc Oxide No. 3 (made by Seido Chemical Industry)
*5Beads Stearic Acid YR (made by NOF Corporation)
*6SANTOFLEX 6PPD (made by Flexsys)
*7Nocrac 224 (made by Ouchi Shinko Chemical Industrial)
*8Extract No. 4 (made by Showa Shell)
*9Gold Flower oil-treated sulfur powder (made by Tsurumi Chemical)
*10Noccelar NS-P (made by Ouchi Shinko Chemical Industrial)

According to the results shown in Table I, it is clear that, with the rubber-covered RFID modules of Examples 1 to 5 according to the present invention, compared with those of the Prior Example and Comparative Examples, it is possible to secure a much better communication distance, while maintaining tire durability.

INDUSTRIAL APPLICABILITY

As explained above, the rubber-covered RFID module of the present invention is extremely useful when used at a given location of a pneumatic tire.

The invention claimed is:

1. An RFID module comprising a transponder covered with a 0.2 to 2 mm thick rubber sheet containing 100 parts by weight of a diene-based rubber, less than 30 parts by weight of carbon black and 5 to 55 parts by weight of silica, having a relative permittivity of 7 or less and having a dynamic modulus of elasticity (E') of 2 to 12 MPa.

2. An RFID module as claimed in claim 1, wherein said diene-based rubber is at least one rubber selected from the group consisting of natural rubber, polyisoprene rubber, polybutadiene rubber, butyl rubber, ethylene-propylene-diene copolymer rubber and styrene-butadiene copolymer rubber.

3. An RFID module as claimed in claim 1, wherein said rubber sheet is comprised of a rubber composition of 100 parts by weight of the diene-based rubber into which 0 to 10 parts by weight of carbon black and 15 to 45 parts by weight of silica are compounded.

4. A pneumatic tire in which an RFID module according to claim 1 is embedded inside the tire at a position above a rim-flange contact portion from a tire shoulder portion.

5. An RFID module as claimed in claim 2, wherein said rubber sheet is comprised of a rubber composition of 100 parts by weight of the diene-based rubber into which 0 to 10 parts by weight of carbon black and 15 to 45 parts by weight of silica are compounded.

6. A pneumatic tire in which an RFID module according to claim 5 is embedded inside the tire at a position above a rim-flange contact portion from a tire shoulder portion.

7. A pneumatic tire in which an RFID module according to claim 2 is embedded inside the tire at a position above a rim-flange contact portion from a tire shoulder portion.

8. A pneumatic tire in which an RFID module according to claim 3 is embedded inside the tire at a position above a rim-flange contact portion from a tire shoulder portion.

* * * * *